Aug. 31, 1965  E. J. BURKE ETAL  3,204,164
ENCASED ELECTRICAL CAPACITOR
Filed June 21, 1961

EARL J. BURKE
NORMAN H. BOND
WILLIAM A. MAUSERT
*INVENTORS*

BY *Connolly and Hutz*

THEIR ATTORNEYS

United States Patent Office 3,204,164
Patented Aug. 31, 1965

3,204,164
ENCASED ELECTRICAL CAPACITOR
Earl J. Burke, Stamford, Vt., and Norman H. Bond, Williamstown, and William A. Mausert, North Adams, Mass., assignors to Sprague Electric Company, North Adams, Mass., a corporation of Massachusetts
Filed June 21, 1961, Ser. No. 118,710
3 Claims. (Cl. 317—260)

This invention relates to the encasement of electrical components, and more particularly to the encasement of cylindrical electrical capacitors.

It is desirable to have an electrical component fit snugly into the casing in which it is positioned for permanent retention. Accordingly, the outer diameter of an electrical component and the inner diameter of a casing must be fitted so as to provide snugness. The attainment of this desirable condition, however, is complicated in the case of capacitors by the fact that capacitor sections as produced vary in outer diameter. These variations are present even in capacitor sections having the same component parts and electrical characteristics. Therefore, slight differences between the outer dimensions of the capacitor section and the inner diameter of the casing occur in normal assembly procedures as a result of standard practices.

A cylindrical electrical capacitor is made up of a combination of elements formed into a cylindrical body generally having a greater length than diameter. The capacitor has attached to it at least two electrical leads which extend from the body of the capacitor to permit circuit connections thereto. The electrical elements making up the body of the capacitor are not generally resistant to physical damage or ambient conditions. As a result, it is desirable to provide capacitor bodies with suitable protection.

One form of protection for capacitor bodies is a container composed of a rigid material and having a large enough interior to conveniently receive the capacitor body. Conventionally such casings are made of metal or plastic and have a central chamber which receives the capacitor section.

Various techniques have been tried to compensate for the variations in the fit of capacitor sections in these rigid casings, and the consequent disparities. The adjustments have been unsuitable or troublesome. Some of them are time consuming and others are wasteful. For the most part such compensating techniques are not amenable to high speed assembly operations and introduce unnecessary delays in capacitor production.

It is an object of this invention to provide a novel means for compensating a disparity between the size of an electrical component and a casing containing such component.

It is another object of this invention to provide a means for snugly fitting a cylindrical capacitor section in a tubular casing.

Still another object of this invention is the provision of a compensating device providing a novel method for tightly securing a small electrical component in a slightly larger casing.

It is a still further object of this invention to provide a closure around and over an electrical component combined with means for snugly fitting the component in a casing.

These and other objects of this invention will become apparent upon consideration of the following description taken together with the accompanying drawing, in which.

In general, this invention provides a means for adapting variations in the overall dimension of convolutely wound capacitor sections into an inelastic container housing. This adapting means includes an intermediate member which automatically snugs between the inelastic container and the capacitor section as part of the assembly operation. In combination with this feature of the intermediate member there may be an end closure construction on the adapting means which cooperates to enclose and secure the section in the container and also to fit the section snugly into the fixed dimension of the inelastic container.

This invention provides a tubular element which has portions in tight abutment with both the inside of a rigid wall container and the outside of a capacitor section of variable dimensions. Upon assembly of these three elements in the manner of this invention, axial pressure on the tubular intermediate member serves to deform the tubular element to take up the spacing between the outer dimension of the capacitor section and the inner dimension of the encompassing container.

Figure 1:
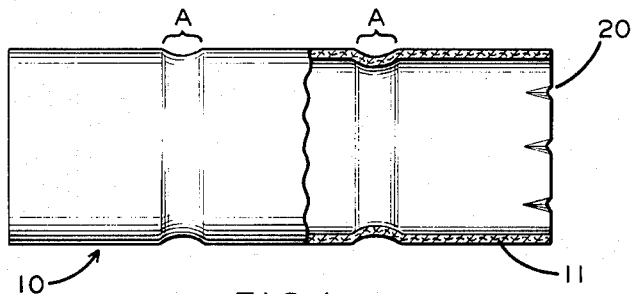
FIGURE 1 is a horizontal elevation partly broken away of a compensating device of this invention.

The interposed element as it appears before assembly is best understood with reference to FIGURE 1 wherein a tubular element 10 according to this invention is shown partly in elevation and partly in section. The tubular element is made of a material of sufficient rigidity to be self-sustaining, yet pliable enough to permit collapse under light processing pressures. In the preferred embodiment of this invention, element 10 has a wall 11 of a material having the stiffness of pasteboard. It should be understood that other suitable materials for element 10 include plastic tubing, and even include thin-walled metal tubing where electrical conduction is required.

The right end of element 10 is shown as being broken away in section to better illustrate that thin cylindrical wall 11 is girdled by a pair of zones A. Each of the zones A is spaced centrally from the respective ends of the element 10 and the zones A are spaced apart from each other. Each zone A is a predisposed area of weakness. Although the preferred embodiment shows two weak areas, it should ge understood that additional zones may be employed for the protection of elongated or fragile components.

In the preferred embodiment, tubular element 10 is made up of a cardboard material which is stiff generally throughout the element 10. The zones A are predisposed to weakness in this preferred embodiment by any suitable action that causes the cardboard material to become pliant without disintegrating or parting. Outside of the zones A the thin cardboard wall 11 has appreciable stiffness under axial pressure. In the zones A the cardboard material is pliant and folds on itself under axial pressure.

Zones A are shown as being beaded or deformed; however, it is within the contemplation of this invention to otherwise predispose tube 10 to collapse at required points. Other suitable means include a ring of holes, thinner wall portions, and portions weakened by heat treatment.

Figure 2:
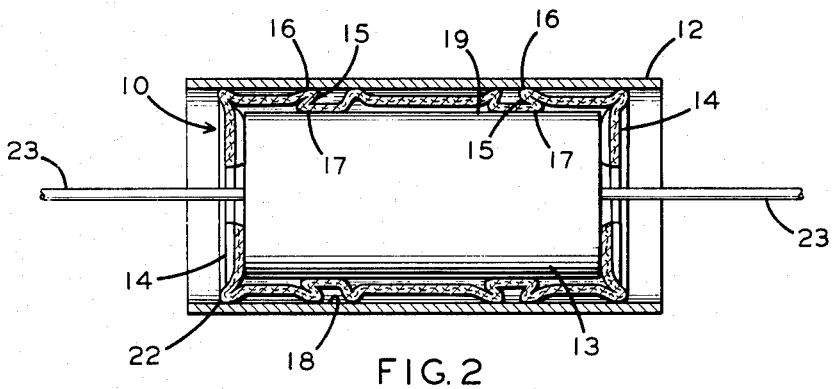
FIGURE 2 is a view of a device according to this invention on a horizontal axis partly in full lines and partly in section.

In the assembled device shown in FIGURE 2, a rigid inelastic wall container 12 is shown housing a capacitor section 13 with the tubular element 10 positioned around the section 13 within the container 12. Thus positioned, the element 10 fits the section 13 into the container 12. In the assembled condition of FIGURE 2, each of the ends of the element 10 is folded inwardly toward the center of the tubular element to form end closures 14 over the respective ends of section 13 within container 12. The element 10 is axially compressed in its position between the section 13 and the container 12. This compression folds the pliant zones A on themselves to provide in each an inverted portion 15 between the folds of a double fold in the wall 11. Each of the zones A have an outer fold 16 and an inner fold 17 containing between them the respective portion 15.

The outer folds 16 abut against an interior surface 18 of container 12, and the inner folds 17 are seated against an outer surface 19 of section 13. The combined folds 16 and 17 and the included inverted portions 15 form generally Z and S shaped cross-sections. Under the axial pressure which collapses the pliant zones A, the inverted portions 15 are jammed between the outer folds 16 and the inner folds 17. The folded zones A girdle section 13 and abut circumferentially against the inner surface 18.

The zones A collapse upon themselves under the axial pressure to the point where the jamming together of each combination of folds 16 and 17 around a respective inverted portion 15 causes the outer fold to become tightly snuggled against the inner surface 18. As the respective inner folds 17 are firmly seated on the section 13 a tight fit is provided of the three basic elements. This tight fit is assured by the tendency of the outer folds 16 to flare outward while the inner folds 17 seat on capacitor section 13. The wedging action of the inverted portions 15 jammed between the respective folds 16 and 17 lends to the snuggling action and the resultant tight fit.

At the same time that the zones A are collapsed by the axial pressure, the ends of the tubular element 10 are folded into the container 12 and around the ends of section 13 by a crimping operation. As shown in FIGURE 1, the tubular element 10 may be provided with slight initial crimps 20 to facilitate later folding of the ends. Crimps 20 are shown in FIGURE 1 as having been applied prior to insertion of capacitor section 13. It will be understood to be within the scope of this invention to produce the crimps after a capacitor is within the tubular element, either at the time of applying axial pressure to collapse zones A, or at the time of folding the ends of the tube. In the assembly of the components of this invention, the ends of element 10 can be folded inward by a pressure exerted endwise against the cardboard tubular element 10. This endwise axial pressure also serves to collapse the zones A.

Figure 3:
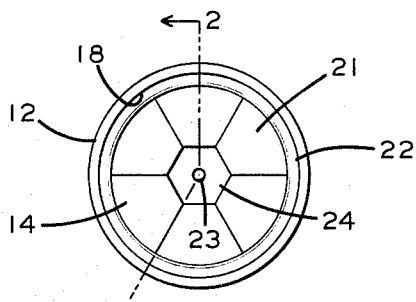
FIGURE 3 is an end elevation of the device of this invention.

The folding of the ends can be enhanced by the use of a tool which engages the crimps 20 and forces a further crimping and folding along the lines of predisposition provided by the initial crimps 20. A suitable crimped and folded end closure 14 of a tubular element 10 is shown in FIGURE 3. The closure 14 of FIGURE 3 has six pie-shaped sections 21 representing areas defined by six folds in the element 10 produced by the crimping and folding.

Since element 10 is of a semi-rigid nature, the fit of section 13 in container 12 is aided by the pie-shaped closure 14 against the end of the capacitor section 13. The fit is accomplished when the folding tool which brings about the folding and mashing operation on the closure of element 10 into the container 12 causes the folding described above.

The outer periphery of the pie-shaped sections 21 forms a shoulder 22 as seen in FIGURE 2 and FIGURE 3 which is contiguous with the inner surface 18 of the container 12 all around the circumference of element 10, as seen in FIGURE 3. The element 10, as seen in FIGURE 2, is braced against the interior surface 18 all around the closure 14 by the shoulder 22, which acts to center and adjust element 10 within container 12. Axial leads 23 project from capacitor section 13 through an opening 24 provided in the end closure 14 by the narrow ends of the pie-shaped sections 21.

The achievement of this construction is preferably accomplished in a two-step operation. The first step is to press the center of the crimp against the capacitor section end to form the end closure 14. The second step is to press on the ends to bring about the evenly distributed pressure of shoulder 22 against the interior surface 18. It will be noted that the inside dimension of the rigid inelastic container 12 is fixed. The shoulder 22 abuts against this interior wall 18 so that the end closure 14 portion of the element 10 matches the inside dimension of the container 12.

The diameter of the end closure 14 adapts itself to the diameter of the container 12. A fixed base is provided from which the element 10 can be made to adjust the variations in the section 13 dimensions to the fixed dimension of the container 12. As pointed out above, the folding of the zones A also provide for adaptation of the section 13 to the container 12. Thus, it is possible to have a relatively large tolerance in capacitor section 13 dimensions and to still get a tight fit into a standard dimension container 12.

The radial fit of capacitor section 13 across the ends of element 10 adjacent the end closures 14 is not critical. As seen in FIGURE 2, element 10 and section 13 are in contact at the ends of the section 13 to limit the axial movement of the section. The fit across the inside of the element 10 is loose at the section 13 ends, and structural contact is not necessary. On the other hand, as pointed out above, the capacitor section 13 is held in the container 12 by the fit of end closures 14 and by the folds 16 and 17 at the jammed-in portions 15 between each pair of respective folds 16 and 17.

The advantages of this invention include the adaptation of a capacitor section to a standard container with wide tolerance possible in the section. For example, a range of 0.084 inch in the diameter of a 0.5 inch capacitor section can be tolerated, because this variation can be reduced to zero in the fit of the section into the container. This adaptation is achieved by means of the structure of the tubular element used in this invention when compressed and folded, particularly as illustrated in FIGURES 2 and 3. Other advantages of this invention are ease of assembly and economy of time and effort in assembly. This invention eliminates the necessity of adding material to the outer surface of a capacitor section to adapt it to a larger container.

The embodiment of this invention described above is preferred and the illustrations set forth one way of achieving this preferred embodiment. Various modifications of the component elements and aspects of this embodiment may be made without departing from the invention. For example, the number and size of the double folds may be increased or decreased. The weakened zone of the wall that is predisposed to folding should be wide enough and pliant enough to cause the break or folding to occur only in or along the weakened zone and not to lead to breaking at other points in the sleeve element.

Further, the precrimping of the ends of the element 10 and the formation of pie-shaped sections, although they are an important aspect, may be omitted. For example, an alternative construction includes the use of a separate washer inserted in each end of the tubular element, and held in place by beading the ends of the tubing onto the washer. However, it will be understood that the benefit of the double folds can be obtained with any form of end closure which will brace against the interior of the container and provide the fixed dimension of the element 10 at this point. This fixed dimension of the end closure then cooperates with the double fold to provide the advantages of this invention.

Other modifications are possible in connection with the stiff material making up the element 10 and in the means and form of the weakened pliant zone which is predisposed to the formation of the double folds. These and other modifications will be readily apparent to those skilled in the art. Accordingly, it is intended that this invention be limited only by the scope of the appended claims.

What is claimed is:

1. A capacitor arrangement providing a fit of a capacitor section within an inelastic rigid wall container, said arrangement including a sleeve member composed of a pasteboard-type material of a generally stiff wall having at least one folded-over end and at least one circumferential pliant area folded on itself to produce an inverted portion intermediate the ends of the member, a cylindrical capacitor section contained within said folded sleeve member having axially extending terminal leads, an inelastic tubular container encompassing said folded sleeve member containing said capacitor section, an end closure folded over the end of the section providing a periphery abutting shoulder against the inner wall of the container and having one of said axial leads extending through the end closure and having one wall of said doube fold based on said capacitor section and the other wall bearing against the inner wall of the container so consrtucted and arranged that axial pressure on said intermediate member causes the periphery of said end closure to bear against the inner surface of the container and the inverted portion of the double fold to force the second fold outward into engagement with the inner wall.

2. An electrical capacitor comprising a cylindrical capacitance section housed in a rigid container, a tubular element located between said section and said container and having major portions of relatively stiff composition and spaced minor portions of less stiff composition, said minor portions being distorted and providing folds bearing outwardly against said container and folds bearing inwardly against said section.

3. An electrical capacitor comprising a convolutely wound capacitance section housed in a rigid container, an element having the radial cross-section of said section and said container, said element encompassing said section and located between said section and said container and having major portions of relatively stiff composition and spaced minor portions of less stiff compositions, said minor portions being distorted and providing folds bearing outwardly against said container and folds bearing inwardly against said section.

References Cited by the Examiner

UNITED STATES PATENTS

| | | | |
|---|---|---|---|
| 2,596,134 | 5/52 | Dorst | 317—260 XR |
| 2,643,327 | 6/53 | Macklenar | 174—138 X |
| 2,885,073 | 5/59 | Bettoli et al. | 229—14 XR |
| 2,995,288 | 8/61 | Jesinghaus | 206—46 XR |
| 2,997,414 | 8/61 | Netherwood | 317—260 X |
| 3,014,978 | 12/61 | Lebert et al. | 317—260 XR |

JOHN F. BURNS, *Primary Examiner.*